US010727461B2

(12) United States Patent
 Idikurt et al.

(10) Patent No.: US 10,727,461 B2
(45) Date of Patent: Jul. 28, 2020

(54) CELL MODULE FOR A BATTERY OF A MOTOR VEHICLE AND METHOD FOR PRODUCING SUCH A CELL MODULE

(71) Applicant: Bayerische Motoren Werke Aktiengesellschaft, Munich (DE)

(72) Inventors: Tuncay Idikurt, Munich (DE); Robert Lustig, Munich (DE); Philip Kotter, Munich (DE); Alexander Muck, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/106,767

(22) Filed: Aug. 21, 2018

(65) Prior Publication Data

US 2018/0358591 A1 Dec. 13, 2018

Related U.S. Application Data

(63) Continuation of application No. PCT/EP2017/053829, filed on Feb. 21, 2017.

(30) Foreign Application Priority Data

Feb. 25, 2016 (DE) .......................... 10 2016 202 912

(51) Int. Cl.
 *H01M 2/10* (2006.01)
 *B60L 50/60* (2019.01)
 (Continued)

(52) U.S. Cl.
 CPC ............ *H01M 2/1077* (2013.01); *B60L 50/66* (2019.02); *H01M 2/10* (2013.01); *H01M 2/1072* (2013.01);
 (Continued)

(58) Field of Classification Search
 CPC ...... H01M 2/10; H01M 10/04; H01M 2/1077; H01M 10/0481; H01M 2/1072; H01M 2002/0297; B60L 11/18; B60L 50/66
 See application file for complete search history.

(56) References Cited

U.S. PATENT DOCUMENTS 10,199,617 B2  2/2019 Hamada
2008/0280194 A1* 11/2008 Okada ................. H01M 10/052
                                                               429/99
(Continued)

FOREIGN PATENT DOCUMENTS

CN      206727188    * 12/2018
DE     42 26 428 A1    2/1994
(Continued)

OTHER PUBLICATIONS

2018544818,Decision_to_Grant_a_Patent_(Translated),Mar. 11, 2020 (Year: 2020).*

(Continued)

*Primary Examiner* — Alexander Usyatinsky
(74) *Attorney, Agent, or Firm* — Crowell & Moring LLP

(57) ABSTRACT

A cell module for a battery of a motor vehicle has a plurality of battery cells for storing electrical energy and a module frame which includes at least two pressure elements, between which the battery cells are arranged, and at least one tension rod which is loaded in tension. The tension rod is formed from a material and by which the pressure elements are clamped against each other via the battery cells. As a result, the battery cells are compressed, wherein the pressure plates are clamped against each other by the tension rod in such a manner that a yield strength or the 0.2% yield limit of the material of the tension rod is reached.

11 Claims, 2 Drawing Sheets

(51) Int. Cl.
*H01M 10/04* (2006.01)
*H01M 2/02* (2006.01)

(52) U.S. Cl.
CPC .......... *H01M 10/0481* (2013.01); *H01M 2002/0297* (2013.01)

(56) References Cited

U.S. PATENT DOCUMENTS

| | | |
|---|---|---|
| 2011/0177377 A1 | 7/2011 | Dube |
| 2012/0214046 A1 | 8/2012 | Lim |
| 2014/0072855 A1 | 3/2014 | Schaefer |
| 2014/0193686 A1* | 7/2014 | Siering ............ H01M 10/4207 429/99 |
| 2015/0104693 A1* | 4/2015 | Dorsch ............... H01M 2/0245 429/156 |

FOREIGN PATENT DOCUMENTS

| | | | |
|---|---|---|---|
| DE | 10 2010 012 930 A1 | | 9/2011 |
| DE | 10 2011 013 617 A1 | | 9/2012 |
| JP | 02007023339 | * | 2/2007 |
| JP | 2007-115604 A | | 5/2007 |
| JP | 2010-92610 A | | 4/2010 |
| JP | 2012-174693 A | | 9/2012 |
| JP | 2012-181970 A | | 9/2012 |
| JP | 2012-182092 A | | 9/2012 |
| JP | 2013-200977 A | | 10/2013 |
| WO | WO 2012/120107 A1 | | 9/2012 |
| WO | WO2012120107 | * | 9/2012 |
| WO | WO 2015/012292 A1 | | 1/2015 |

OTHER PUBLICATIONS

International Search Report (PCT/ISA/210) issued in PCT Application No. PCT/EP2017/053829 dated Apr. 10, 2017 with English translation (five pages).
German-language Search Report issued in counterpart German Application No. 10 2016 202 912.6 dated Nov. 25, 2016 with partial English translation (12 pages).
Japanese-language Office Action issued in Japanese Application No. 2018-544818 dated Jan. 22, 2020 with English translation (three (3) pages).
Japanese-language Office Action issued in counterpart Japanese Application No. 2018-544818 dated Aug. 28, 2019 with English translation (eight pages).

* cited by examiner

CELL MODULE FOR A BATTERY OF A MOTOR VEHICLE AND METHOD FOR PRODUCING SUCH A CELL MODULE

CROSS REFERENCE TO RELATED APPLICATIONS

This application is a continuation of PCT International Application No. PCT/EP2017/053829, filed Feb. 21, 2017, which claims priority under 35 U.S.C. § 119 from German Patent Application No. 10 2016 202 912.6, filed Feb. 25, 2016, the entire disclosures of which are herein expressly incorporated by reference.

BACKGROUND AND SUMMARY OF THE INVENTION

The invention relates to a cell module for a battery of a motor vehicle, and also to a method for producing such a cell module.

It is known from the general prior art and, in particular, from the mass production of vehicles, to equip motor vehicles, such as, for example, automobiles with electrified drive trains. Such an electrified drive train is also referred to as an alternative drive train or an alternative drive and includes at least one electric machine that may be operated as an electric motor so as to drive the respective motor vehicle. Consequently, the motor vehicle may be driven in a purely electric manner. Alternatively or in addition, it is contemplated that such a drive train includes an internal combustion engine for driving the motor vehicle, wherein the electric machine may assist, for example, the internal combustion engine when the motor vehicle is being driven. The motor vehicle is consequently configured by way of example as an electric vehicle or a hybrid vehicle.

In order to be able to operate the electric machine in its motor operation, it is necessary to supply the electric machine with electrical current or electrical energy. For this purpose, usually at least one electrical energy storage device in the form of a battery is used, by means of which electrical energy may be stored. The electric machine may be supplied in its motor operation with electrical energy that is stored in the electrical energy storage device. Usually, such an electrified drive train is heavy and expensive.

The object of the present invention is therefore to provide a cell module and also a method for producing such a cell module with the result that the weight and the costs of electrified drive trains for motor vehicles may be kept particularly low.

This and other objects are achieved by a cell module and by a method of producing the cell module in accordance with embodiments of the invention.

A first aspect of the invention relates to a cell module for a battery of a motor vehicle, in particular a motor vehicle such as a passenger car. The cell module comprises a plurality of battery cells for storing electrical energy or electrical current. The cell module may consequently be used in an electrified drive train that comprises by way of example at least one electric machine in its fully produced state. The electric machine may be operated by way of example in a motor operation and consequently as an electric motor, by means of which the motor vehicle may be driven. In order to operate the electric machine in the motor operation, the electric machine is supplied with electrical energy that is stored in the battery and consequently in the cell module or in the battery cells.

Moreover, the cell module comprises a module frame that comprises at least two pressure elements and at least one tension rod that is placed under tension and is formed from a material. The battery cells are arranged between the pressure elements herein. The pressure elements are arranged by way of example spaced from one another along a direction, wherein the battery cells are arranged by way of example along said direction consecutively or one behind the other and between the pressure elements. The pressure elements are clamped against one another by the tension rod whilst arranging the battery cells, as a result of which the battery cells are pressed together. By way of example, the pressure elements are connected to one another via the tension rod that is placed under tension with the result that the battery cells that are arranged between the pressure elements are pressed together. The battery cells are clamped or pushed together by means of the pressure elements by virtue of the fact that the tension rod is placed under tension.

In order to then be able to keep the weight and costs of the cell module and consequently of the battery and also of the electrified drive train overall particularly low, the pressure plates are stressed against one another by way of the tension rod such that a yield strength or the 0.2% yield limit of the material of the tension rod is achieved. In other words, the tension rod is placed under tension so as to brace the pressure elements against one another and consequently to clamp together the battery cells such that the yield strength or the 0.2% yield limit of the material of the tension rod is achieved. The installation space that is required by the cell module and consequently the battery overall may be kept small by using the module frame. Moreover, it is possible to hold the individual battery cells together in a compact manner with the result that the cell module may be handled as a unit that is pre-assembled or may be pre-assembled. As a consequence, the battery may be produced in a particularly simple and consequently rapid and cost-effective manner. The result is that the costs of the battery and consequently of the electrified drive train may be kept low.

Furthermore, owing to the described tensioning of the battery cells that is caused by means of the tension rod, it is possible overall to use particularly cost-effective and light-weight materials for the tension rod and in particular for the module frame. The result is that the weight and the costs of the cell module and consequently of the electrified drive train may be kept particularly low.

The material of the tension rod is by way of example a metal material, in particular a light metal or a light metal alloy such as by way of example aluminum or an aluminum alloy. The result is that the battery cells are clamped together particularly well, and the weight and the costs may be kept particularly low.

The invention is based in particular on the concept of utilizing or selecting elastic characteristics of the material in such a manner that, by way of example, during the serviceable life of the cell module cyclical loads that occur are cushioned, absorbed or compensated in a purely tensile elastic manner, in other words purely by way of tensile elastic characteristics of the material, whereas an increase in length of the cell module that is caused by aging is expediently absorbed by the plastic deformation of the tension rod.

It is preferred that the pressure plates are stressed against one another by the tension rod such that the yield strength or the 0.2% yield limit of the material of the tension rod is precisely achieved, in other words that the tension rod or the material thereof is loaded precisely up to the yield strength or up to the 0.2% yield limit. If, by way of example, an expansion of the battery cells occurs during the serviceable life of the cell module, in particular along the above-mentioned direction along which the pressure elements are spaced from one another, the tension rod thus increasingly extends. Since the yield strength or the 0.2% yield limit has already been achieved, in particular exactly or precisely, prior to the start of the serviceable life of the cell module, each further incremental extension of the tension rod leads to a plastic deformation of the tension rod, wherein this plastic deformation may not or should not lead to a necking in the material of the tension rod until the end of the serviceable life. As a consequence, it is ensured that a tensioning force that is caused by the tension rod for clamping the battery cells together remains at least approximately constant during the serviceable life. In other words, an at least approximately uniform load on the battery cells may be ensured over the serviceable life. Consequently, varying mechanical loads on the battery cells may be avoided over the serviceable life. Moreover, the material or material characteristics of the tension rod may be at least approximately entirely utilized with the result that it may be overall possible to avoid overdimensioning the tension rod and, consequently, the module frame, which would be disadvantageous with regards to weight and cost. The weight and the costs may consequently be kept low.

The yield strength is usually referred to as $R_e$ and is a material characteristic value and refers to the tension value up to which the material does not show any permanent plastic deformation in the case of a uniaxial and torque-free tensile load. In this case, it is a yield point. The battery cells that are arranged between the pressure elements and, by way of example are arranged one behind the other or consecutively, form a battery pack, the length of which may increase by way of example as a result of aging. As a consequence, this increase in length increases—starting from the yield strength or from the 0.2% yield limit—the load that is acting upon the tension rod or the extension of the tension rod with the result that the tension rod deforms in a plastic manner.

In an advantageous embodiment, the yield strength is the upper yield strength that is usually also referred to as $R_{eH}$. If the material of the tension rod comprises, by way of example, an upper yield strength $R_{eH}$ and also a lower yield strength $R_{eL}$, then the above-mentioned yield strength is preferably the upper yield strength $R_{eH}$. The result is that an increase in length of the battery pack and consequently an increasing extension of the tension rod—starting from the upper yield strength—leads to a plastic deformation of the tension rod.

It has proven particularly advantageous if one of the pressure elements is provided as a fixed bearing that may be fixed to a component, in particular a housing, of the battery. The battery consequently comprises in its fully produced state the cell module and at least one further component that is configured by way of example as a housing. The cell module herein is held on the further component. It is preferably provided herein that one of the pressure elements is configured as a fixed bearing that is fixed or may be fixed on the further component, in particular the housing, of the battery. As a consequence, a defined and secure and also light and cost-effective holding arrangement of the cell module may be ensured without an excessive number of additional heavy and cost-intensive holding elements being provided and being required.

In order to keep the costs and the weight of the cell module particularly low, it is provided in the case of a further embodiment of the invention that the other pressure element is configured as a floating bearing that permits the other pressure element to be displaced relative to the component of the battery. In other words, the other pressure element is preferably a floating bearing and is consequently expediently configured in such a manner that it may be displaced. As a consequence, tensions and consequently excessive loads on the cell module may be avoided. The result is that the cell module may be provided in a particularly light and cost-effective manner.

In a further embodiment of the invention, the yield strength or the 0.2% yield limit is achieved in the fully charged state of the battery cells. As a consequence, in particular at the start of the serviceable life of the cell module, a defined state is achieved and starting from said defined state, if the length of the battery pack is increased, a desired plastic deformation of the tension rod occurs. In particular, it is possible by way of this embodiment to cushion, to absorb or to compensate cyclical loads in a purely tensile elastic manner. If by way of example starting from the fully charged state of the battery cells a reduction in length or a decrease in length of the battery pack occurs, whereupon an increase in length of the battery pack occurs again in such a manner that the yield strength or the 0.2% yield limit is not exceeded, these length changes may thus be absorbed in an elastic, in particular tensile elastic, manner, in other words by means of the elastic deformation of the tension rod. However, if the length increases as a result of aging starting from the yield strength or the 0.2% yield limit, the yield strength or 0.2% yield limit is exceeded. The result is that increases in length of this type are absorbed by plastic deformation of the tension rod.

In order to keep the weight and the costs of the cell module particularly low, it is provided in a further embodiment of the invention that the tension rod is connected to the pressure elements in a materially-bonded manner. For this purpose, the tension rod is by way of example welded to the pressure elements. By way of example, the pressure elements are formed from a metal material. Moreover, it is contemplated for the pressure elements to be configured as pressure plates.

A battery for a motor vehicle, in particular a car such as a passenger car, is also associated with the invention, wherein the battery comprises at least one cell module in accordance with the invention. Advantages and advantageous embodiments of the cell module in accordance with the invention are to be viewed as advantages and advantageous embodiments of the battery in accordance with the invention, and vice versa.

A second aspect of the invention relates to a method for producing a cell module for a battery of a motor vehicle, in particular a cell module in accordance with the first aspect of the invention. In a first step of the method, a plurality of battery cells is provided for storing electrical energy or electrical current. In a second step of the method, a module frame is provided that comprises at least two pressure elements and at least one tension rod that is formed from a material, in particular a metal material. In a third step of the method, the battery cells are arranged between the pressure elements. By way of example, the pressure elements are arranged in such a manner that they are spaced from one another along a direction. The battery cells herein are arranged by way of example between the pressure elements in such a manner that the battery cells are arranged along said direction one behind the other or consecutively. In a fourth step of the method, the pressure elements are stressed against one another by the tension rod whilst arranging the battery cells, as a result of which the tension rod is placed under tension. The pressure plates herein are stressed against one another by means of the tension rod in such a manner that the material of the tension rod achieves a yield strength or the 0.2% yield limit, in particular precisely or exactly. Advantages and advantageous embodiments of the first aspect of the invention are to be viewed as advantages and advantageous embodiments of the second aspect of the invention, and vice versa.

It is preferred that the yield strength or the 0.2% yield limit of the material of the tension rod is achieved exactly directly after the production of the cell module and consequently at the start of its serviceable life. As a consequence, cyclical loads—in particular starting from the yield strength or 0.2% yield limit—may be absorbed by means of elastic deformation of the tension rod, wherein increases in length that are caused by aging are absorbed by the plastic deformation of the tension rod. This means by way of example that at the start of the serviceable life of the cell module, the module frame is preferably loaded with fully-charged battery cells precisely up to the yield strength, in particular $R_{eH}$, or up to the 0.2% yield limit ($R_{p,0.2}$). Each further incremental extension of the tension rod leads to a plastic deformation of the tension rod, as a result of which it is ensured that a tensioning force for clamping the battery cells together that acts upon the battery cells and is caused by the module frame remains at least at an approximately constant level.

In the case of an advantageous embodiment of the second aspect of the invention, it is provided that the battery cells are clamped against one another by a compression device that differs from the module frame. In the state in which said battery cells are pressed together by the compression device, said battery cells are provided with the module frame. In particular, by way of example it is initially provided that the pressure elements and the battery cells that are arranged between the pressure elements are pressed together by the compression device with the result that the battery cells that are arranged between the pressure elements are pressed together via the pressure elements by the compression device and consequently said battery cells are pushed together or pressed together. In this state, the tension rod is coupled to, in particular connected to, the pressure elements, whereupon by way of example the cell module is released from the compression device or whereupon the compression that is effected by the compression device is terminated. The material of the tension rod herein achieves the yield strength or the 0.2% yield limit, in particular precisely or exactly, preferably directly or immediately after the compression that is effected by the compression device is terminated. As a consequence, at the start of the serviceable life of the cell module, a defined starting state is achieved and, starting from said defined state, cyclical loads may be absorbed by means of elastic deformation. However, increases in length of the battery pack that are caused by aging may be absorbed by means of plastic deformation of the tension rod. As a consequence, particularly light and cost-effective materials may be used for the tension rod.

Finally, it has proven particularly advantageous if the tension rod is connected to the pressure elements in the state in which the battery cell is pressed together by the compression device. As a consequence, by way of example the tension rod is then and only then placed under tension if the compression that is effected by the compression device is terminated, in other words if the compression device is released from the cell module. The tension rod is consequently used in order to contribute to or to cause a compression of the battery cells after the compression of the battery cells that is caused by the compression device is terminated. The result is that the tension rod is placed under tension. A defined state and, in particular, a defined starting state and also a defined load on the tension rod, in particular at the start of the serviceable life of the cell module, may be realized by means of this connection of the tension rod to the pressure elements. It is consequently possible in a defined manner by means of elastic deformation of the tension rod to compensate cyclical loads or changes in length and by means of plastic deformation of the tension rod to absorb increases in length of the battery pack that are caused by aging. Consequently, the costs and the weight of the cell module may be kept particularly low.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical or functionally identical elements are provided with identical reference numerals.

DETAILED DESCRIPTION OF THE DRAWINGS

Figure 1:
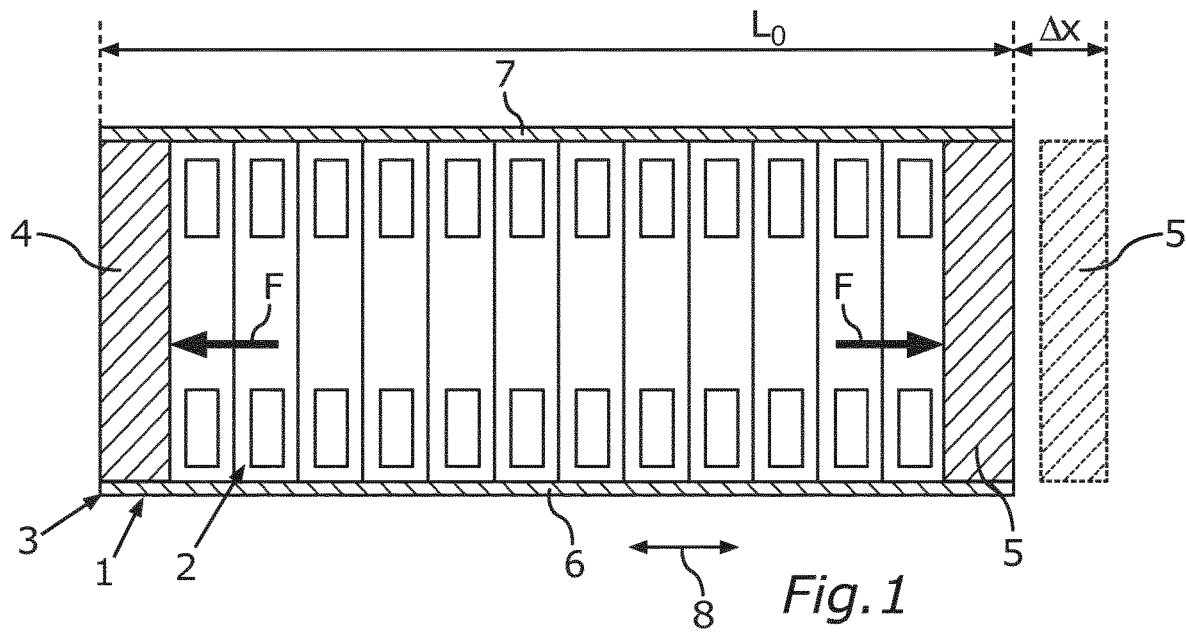
FIG. 1 is a schematic plan view of a cell module for a battery of a motor vehicle, said cell module having at least one tension rod that is formed from a material, wherein the tension rod is placed under tension so as to clamp together battery cells of the cell module such that a yield strength or the 0.2% yield limit of the material of the tension rod is achieved.

FIG. 1 illustrates in a schematic plan view a cell module that is as a whole referred to using the numeral 1 for a battery of a motor vehicle, in particular of a car such as by way of example a passenger car. In its fully manufactured state, the motor vehicle includes an electrified drive train having at least one electric machine and the above-mentioned battery with the cell module 1. As produced, the battery has for example a plurality of cell modules, of which in FIG. 1 the cell module that is referred to using the numeral 1 is representative.

The electric machine is in a motor operation and consequently may be operated as an electric motor with the result that the motor vehicle may be driven by the electric motor. In order to operate the electric machine in the motor operation, it is necessary to supply the electric machine with electrical current or electrical energy. The battery is an electrical energy storage device by which or in which electrical energy or electrical current may be stored. The electric machine may be supplied with electrical energy that is stored in the battery in order as a consequence to operate the electric machine in its motor operation.

For this purpose, the cell module 1 includes a plurality of battery cells 2, by which the electrical energy may be stored. Each respective battery cell 2 comprises by way of example a cell housing which accommodates by way of example an electrolyte of the respective battery cell 2. Moreover, the cell module 1 comprises a module frame that, as a whole, is referred to using the numeral 3. The module frame comprises at least two pressure elements in the form of pressure plates 4 and 5. Moreover, the module frame 3 comprises tension rods 6 and 7 that are placed under tension and that, in each case, are formed from a material, in particular from a metal material.

It is apparent from FIG. 1 that the pressure plates 4 and 5 are arranged spaced from one another along a direction that is illustrated in FIG. 1 by means of a double arrow 8. The battery cells 2 herein are arranged along the mentioned direction 8 between the pressure plates 4 and 5, wherein the battery cells 2 are arranged consecutively or one behind the other. The pressure plates 4 and 5 are stressed against one another by way of the tension rods 6 and 7 whilst arranging the battery cells 2, as a result of which the battery cells 2 are clamped together. In other words, the tension rods 6 and 7 that are placed under tension are coupled to, in particular connected to, the pressure plates 4 and 5. The result is that the tension rods 6 and 7 that are placed under tension connect the pressure plates 4 and 5 to one another, and the battery cells 2 are clamped together. The battery cells 2 form a battery pack that has a length that extends along the stated direction. FIG. 1 illustrates a starting length of the battery pack, wherein in FIG. 1 a starting length $L_0$ of the cell module 1 is furthermore illustrated.

Within the scope of a method for producing the cell module 1, for example convex and/or prismatic battery cells 2 are stacked one on top of the other. The stacked battery cells 2 are pressed together to form a specific nominal dimension by way of example via a compression device that differs from the cell module 1. And, subsequently or in the state in which said battery cells are pressed together by the compression device, the battery cells are clamped to the module frame 3. The compression device is then released. It is to be understood from this that the compression that is effected by the compression device is terminated. As a consequence of releasing the compression device, a resetting force of the battery cells 2 acts, in particular via the pressure plates 4 and 5, on the tension rods 6 and 7 that are connected, in particular welded, to the pressure plates 4 and 5. The result is that by way of example a first, in particular elastic, elongation of the tension rod 6 and 7 or of the cell module 1 takes place overall directly after the cell module is produced. An elongation of the tension rods 6 and 7 or of the cell module 1 is overall also referred to as an increase in length. The mentioned first, in particular elastic, elongation is also referred to as $\varepsilon_{assembly}$. Consequently, a permanent, almost static tension prevails via the tension rods 6 and 7.

Figure 3:
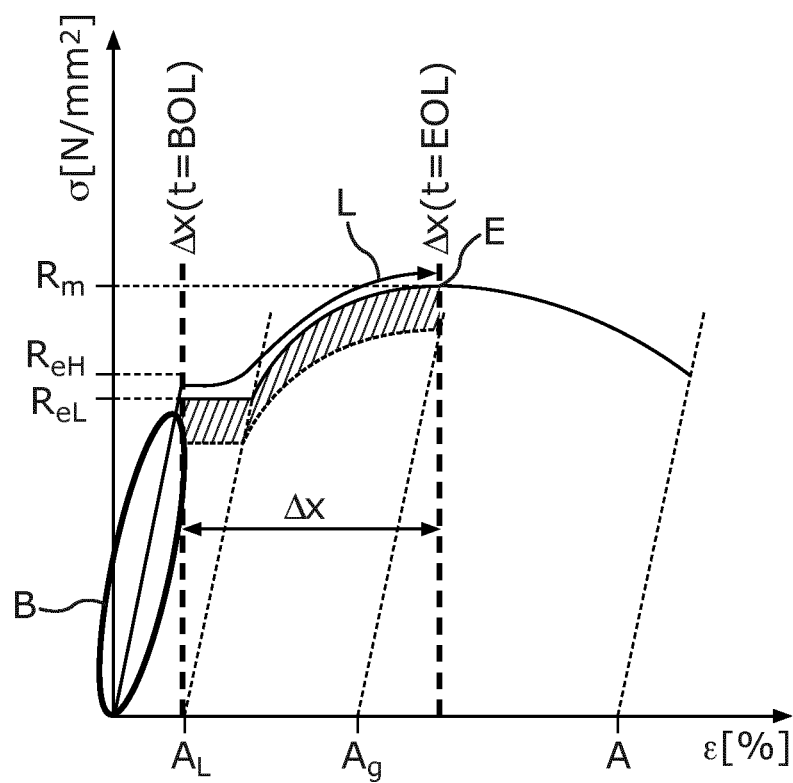
FIG. 3 is a stress-strain diagram illustrating a behavior of the tension rod, in particular over the serviceable life of the cell module.

FIG. 3 illustrates a stress-strain diagram of the respective material of the tension rods 6 and 7. As is generally known, the stress-strain diagram illustrates the tensile strength $R_m$, the upper yield strength $R_{eH}$, the lower yield strength $R_{eL}$, the Lüders elongation $A_L$, the uniform elongation $A_g$ and the elongation at rupture A after which a rupture occurs. The start of the necking is referred to as E. The elastic region B of the respective tension rod 6 or 7 or of the respective material from which the respective access 6 or 7 is formed is located to the left-hand side of the upper yield strength $R_{eH}$. The module frame 3, in particular the tension rods 6 and 7, may be dimensioned by way of example in such a manner that all quasi static and cyclical loads do not exceed the purely elastic region B of the material that is used. Moreover, it may be provided that the two pressure plates 4 and 5 are designed as fixed bearings with the result that the pressure plates 4 and 5 are fixed, in particular in a non-displaceable manner, by way of example to a further component such as for example a housing of the battery. Such a design of the module frame 3 and the pressure plates 4 and 5 as fixed bearings, however, is disadvantageous as explained below.

The battery cells 2 during operation cause a cyclical load by means of charging and discharging, wherein this cyclical load leads to cyclical elongations or length changes, in particular increases in length. These cyclical elongations are referred to as $\varepsilon_{SOC}$. The phrase the "charging or discharging of the battery cells 2 and consequently of the battery" is understood to mean that electrical energy is stored in the battery cells 2, in other words that the battery is charged with electrical energy. The term "discharge" is understood to mean that electrical energy that is stored in the battery cells 2 or in the battery is drawn from the battery or is discharged from the battery.

Moreover, temperature gradients act upon mechanical module components, by which the battery cells 2 are held under tension. These mechanical module components for example are the tension rods 6 and 7 and the pressure plates 4 and 5. These temperature gradients cause temperature-dependent length changes, elongation changes or elongations that are also referred to as $\varepsilon_T$. These cyclical lengthenings or length changes overlap an at least approximately linear increase of the length of the cell module 1 in dependence upon its age or serviceable life, measured by way of example on the residual capacity of the battery, wherein the at least approximately linear increase is also referred to as a lengthening or increase in length that is also referred to as $\varepsilon_{SOH}$. All extensions together cause a force that acts against the module frame 3 that is also referred to as swelling force and is illustrated in FIG. 1 by means of force arrows F. The swelling force F involves a lengthening that is referred to as $\Delta x$ in FIG. 1, in other words an increase in length of the cell module 1 and consequently of the tension rods 6 and 7. The lengthening $\Delta x$ of the cell module 1 consequently may be described in dependence upon the time t and in dependence upon the serviceable life of the cell module 1 in accordance with a formula:

$$\Delta x(t) \approx \varepsilon_{SOH}(t) + \varepsilon_{SOC}(C) + \varepsilon_T(T) \varepsilon_{Assembly},$$

wherein t refers to the time, C refers to the state of charge and T refers to the temperature or the mentioned temperature gradients. The disadvantages of a changing mechanical load on the battery cells 2 over the serviceable life, i.e., an excessively heavy and unnecessary weight and unnecessarily high costs and also that material characteristics are not completely utilized, result from the above-described disadvantageous design of the cell module 1. Moreover, operating behavior is only in part maintained.

In order to avoid these disadvantages, it is provided that the battery cells 2 are clamped together or that the pressure plates 4 and 5 are stressed against one another by use of the tension rods 6 and 7 in such a manner that, in particular, after the compression device is released, the upper yield strength $R_{eH}$ or the 0.2% yield limit $R_{P,0.2}$ of the material of the tension rods 6 and 7 is exactly or precisely achieved. In other words, as a consequence of placing the battery cells 2 under tension, the tension rods 6 and 7 are loaded in such a manner that the yield strength or the 0.2% yield limit of the material is exactly or precisely achieved. In FIG. 3, the start of the serviceable life of the cell module 1 is referred to as BOL, wherein the end of the serviceable life is referred to as EOL. Consequently, $\Delta x(t=BOL)$ refers to the increase in length or length of the cell module 1 at the start of the serviceable life, in particular directly or immediately after the compression device is released. Moreover, $\Delta x(t=EOL)$ refers to the length or the increase in length of the cell module 1 at the end of the serviceable life. Moreover, an arrow L illustrates in FIG. 3 the serviceable life of the cell module and the behavior of the tension rods 6 and 7 during the serviceable life or during the elongation of the tension rod.

In the case of the cell module 1 it is consequently provided to utilize or to select the elastic characteristics of the material of the tension rods 6 and 7 in such a manner that cyclical loads are absorbed in a purely tensile elastic manner. In other words, cyclical loads are cushioned or compensated by the elastic deformation of the tension rods 6 and 7 and consequently by the elastic region B. On the other hand, the increase in length Δx of the cell module 1 that is caused by aging is expediently absorbed by plastic deformation of the tension rods 6 and 7. At the start of the serviceable life, the tension rods 6 and 7 are loaded in a state, in which the battery cells 2 are fully charged, exactly to the yield strength or to the 0.2% yield limit such that the yield strength or the 0.2% yield limit of the respective material of the tension rods 6 and 7 is exactly achieved immediately after the compression device is released. This leads to the fact that, by way of example, starting from the upper yield strength $R_{eH}$ each further incremental elongation of the tension rods 6 and 7 leads to a plastic deformation of the tension rods 6 and 7. This plastic deformation should not, however, lead to a necking in the material until the end of the serviceable life. As a consequence, it is ensured that a tensioning force that is caused by the tension rods 6 and 7 so as to clamp together the battery cells 2 remains at an at least approximately constant level.

Figure 2:
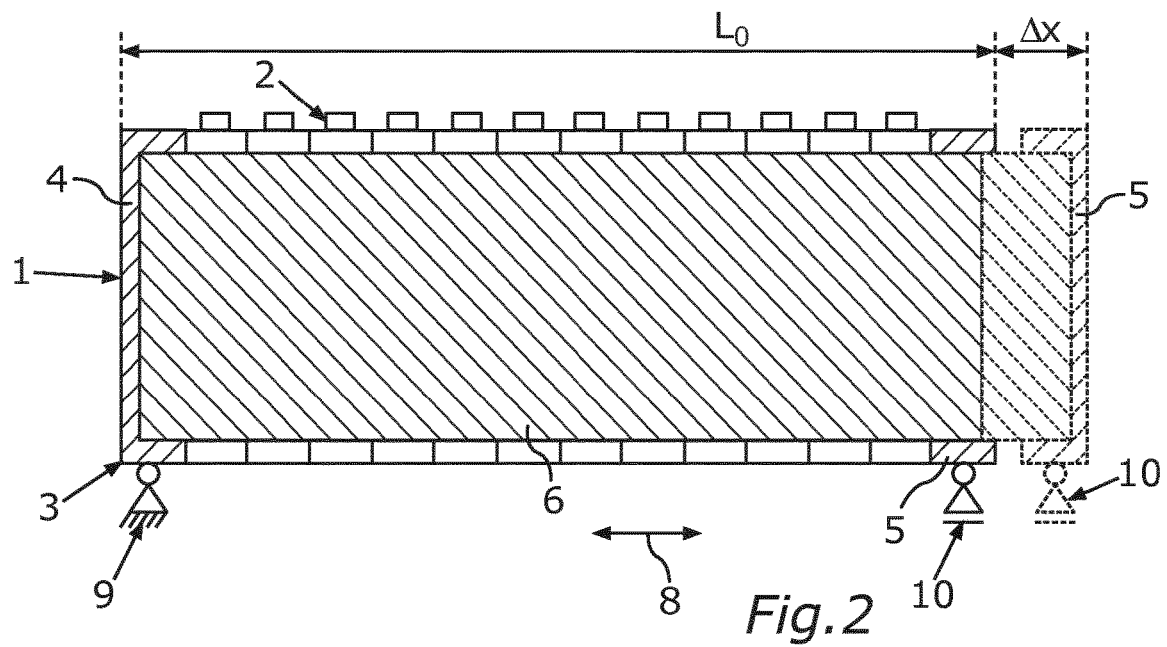
FIG. 2 is a schematic side view of the cell module of FIG. 1.

It is apparent in FIG. 2 that, moreover, it is preferably provided to configure the pressure plate 4 as a fixed bearing 9 that is fastened to the mentioned component, in particular to the housing, of the battery. The other pressure plate 5 is preferably configured as a floating bearing 10 that permits the pressure plate 5 to be displaced relative to the component of the battery, in particular relative to the housing of the battery. As a consequence, the pressure plate 4 is used as a fixed bearing 9 while the pressure plate 5 is configured so as to be expediently mounted in a displaceable manner. Corresponding provisions for extensions are expediently provided in the, for example, high voltage battery (HV battery). As a consequence of its embodiment as an HV-battery, the battery has for example an operating voltage of more than 50 V, in particular more than 60 V. In particular, the battery has an operating voltage of more than 100 V. In FIGS. 1 and 2, the cell module 1 is illustrated in its starting length $L_0$ by solid lines, wherein the lengthening Δx is illustrated by means of dashed lines.

It is possible, by means of the described, expedient load of the tension rods 6 and 7 immediately after the compression device is released such that the yield strength or the 0.2% yield limit is exactly achieved, to avoid overdimensioning the module frame 3. The result is that the module frame 3 and consequently the cell module 1 may be configured overall in a particularly light and cost-effective manner. Moreover, an at least approximately uniform load on the battery cells 2 over the serviceable life may be ensured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Cell module
2 Battery cells
3 Module frame
4 Pressure plate
5 Pressure plate
6 Tension rod
7 Tension rod
8 Double arrow
9 Fixed bearing
10 Floating bearing
B Elastic region
E Necking
F Force arrow
L Arrow
$R_m$ Tensile strength
$R_{eH}$ Upper yield strength
$R_{eL}$ Lower yield strength
$A_L$ Lüders elongation
$A_g$ Uniform elongation
A Elongation at rupture
Δx Lengthening
$L_0$ Starting length
BOL Start of the serviceable life
EOL End of the serviceable life

What is claimed is:

1. A cell module for a battery of a motor vehicle, comprising:
   a plurality of battery cells that store electrical energy;
   a module frame comprising at least two pressure elements and at least one tension rod, wherein
   the plurality of battery cells are arranged between said two pressure elements,
   the tension rod is loaded in tension and by which the two pressure elements are stressed against one another via the plurality of battery cells whereby the battery cells are clamped together, and
   the two pressure elements are stressed against one another via the at least one tension rod such that a yield strength or 0.2% yield limit of a material of the tension rod is reached in a fully charged state of the plurality of battery cells.

2. The cell module as claimed in claim 1, wherein the yield strength is an upper yield strength of the material.

3. The cell module as claimed in claim 1, wherein one of the pressure elements is provided as a fixed bearing, the fixed bearing being fixable to a component of the battery.

4. The cell module as claimed in claim 3, wherein the component is a housing of the battery.

5. The cell module as claimed in claim 3, wherein the other pressure element is configured as a floating bearing displaceable relative to the component.

6. The cell module as claimed in claim 1, wherein the tension rod is connected to the pressure elements in a materially-bonded manner.

7. The cell module as claimed in claim 1, wherein the pressure elements are pressure plates.

8. A battery for a motor vehicle, said battery comprising at least one cell module as claimed in claim 1.

9. A method for producing a cell module for a battery of a motor vehicle, the method comprising the steps of:
   providing a plurality of battery cells for storing electrical energy;
   providing a module frame that comprises at least two pressure elements and at least one tension rod that is formed from a material;

arranging the battery cells between the pressure elements;

stressing the pressure elements against one another via the plurality of battery cells by way of the tension rod, whereby the tension rod is placed under tension, wherein the pressure elements are stressed against one another by the tension rod such that the material of the tension rod reaches a yield strength or a 0.2% yield limit in a fully charged state of the plurality of battery cells.

10. The method as claimed in claim 9, wherein the plurality of battery are pressed against one another by a compression device that differs from the module frame, and in the state in which said plurality of battery cells are clamped together by the compression device, said plurality of battery cells are provided with the module frame, wherein the material of the tension rod reaches the yield strength or the 0.2% yield limit after the compression that is effected by the compression device is terminated.

11. The method as claimed in claim 10, wherein the tension rod is connected to the pressure elements in the state in which the plurality of battery cells are pressed together via the compression device.

\* \* \* \* \*